United States Patent [19]
Dadea

[11] Patent Number: 5,993,605
[45] Date of Patent: Nov. 30, 1999

[54] APPARATUS FOR MANUFACTURING A FILTERING MEDIUM IN SHEET FORM

[75] Inventor: Gianmaria Dadea, Fabriano, Italy

[73] Assignee: Fad-Fabriano Autoadesivi S.p.A., Sassoferrato, Italy

[21] Appl. No.: 08/891,783

[22] Filed: Jul. 14, 1997

[30] Foreign Application Priority Data

Jul. 18, 1996 [IT] Italy .................................. MI96A1495

[51] Int. Cl.⁶ .............................. D21F 13/00; D21F 1/60; D21F 1/58
[52] U.S. Cl. ........................ 162/298; 162/304; 162/300; 162/321; 162/334
[58] Field of Search .................................. 162/298, 299, 162/300, 334, 321, 109, 123, 125, 133, 304; 210/491, 493

[56] References Cited

U.S. PATENT DOCUMENTS

| | | | |
|---|---|---|---|
| 1,152,467 | 9/1915 | Zarnowiecki | 162/132 X |
| 1,615,391 | 1/1927 | Little | 162/334 X |
| 1,737,284 | 11/1929 | Loomis | 162/132 X |
| 1,788,531 | 1/1931 | Little | 162/334 X |
| 1,972,127 | 9/1934 | Beeson | 162/132 X |
| 3,640,839 | 2/1972 | Ochiai . | |
| 4,961,824 | 10/1990 | Laitinen et al. | 162/123 |

FOREIGN PATENT DOCUMENTS

| | | |
|---|---|---|
| 41 05 613 | 8/1992 | Germany . |
| 215782 | 6/1921 | Nauru . |
| 94 20679 | 9/1994 | WIPO . |

*Primary Examiner*—Jose Fortuna
*Attorney, Agent, or Firm*—Guido Modiano; Albert Josif; Daniel J. O'Byrne

[57] ABSTRACT

An apparatus for manufacturing a filtering medium in sheet form, comprising at least one first continuous machine, adapted for manufacturing paper and the like and suitable to form at least one first web on a first conveyor, and at least one second continuous machine also adapted for manufacturing paper and the like and suitable to form at least one second web on at least one second conveyor, the at least one second conveyor being arranged so as to make the at least one second web rest by gravity on the at least one first web, and at least one of the first and second continuous machines being suitable to form a web which is not uniformly distributed.

3 Claims, 3 Drawing Sheets

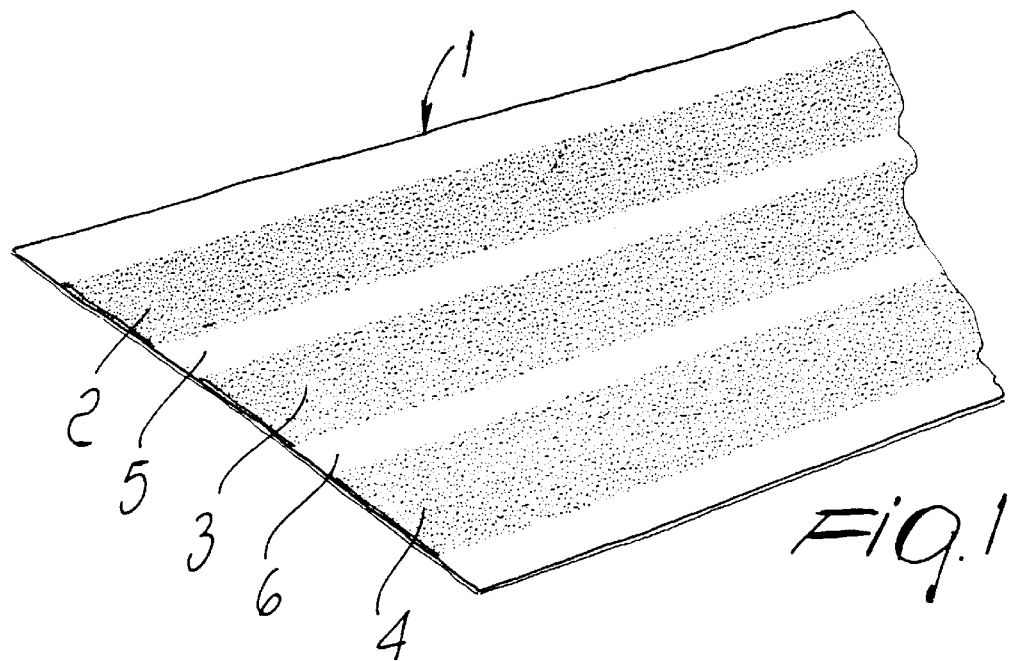
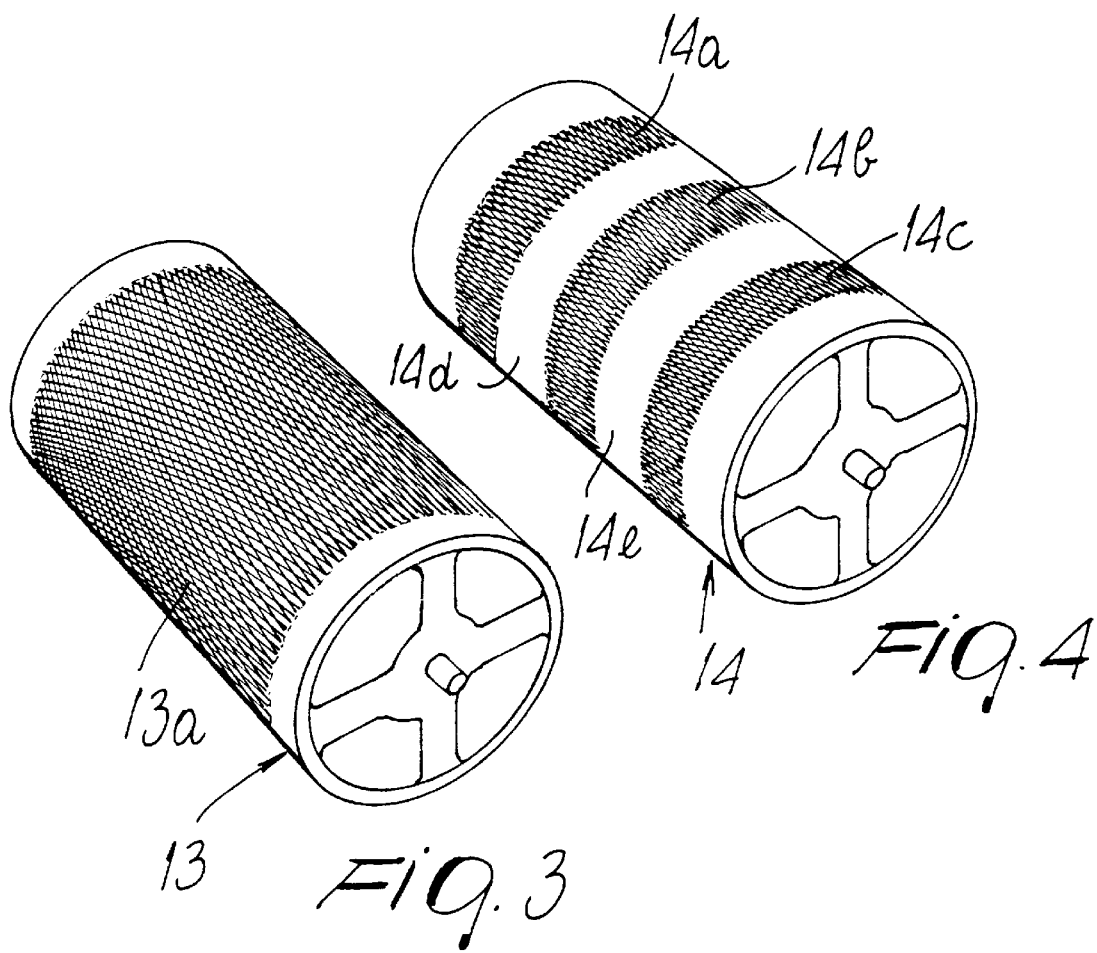

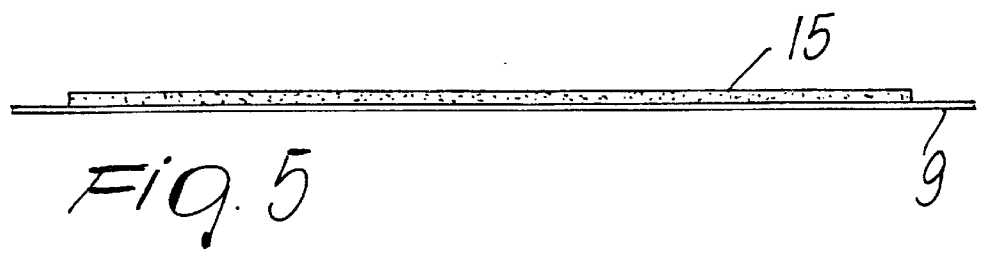
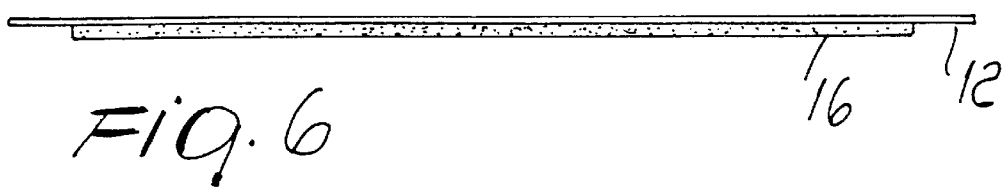
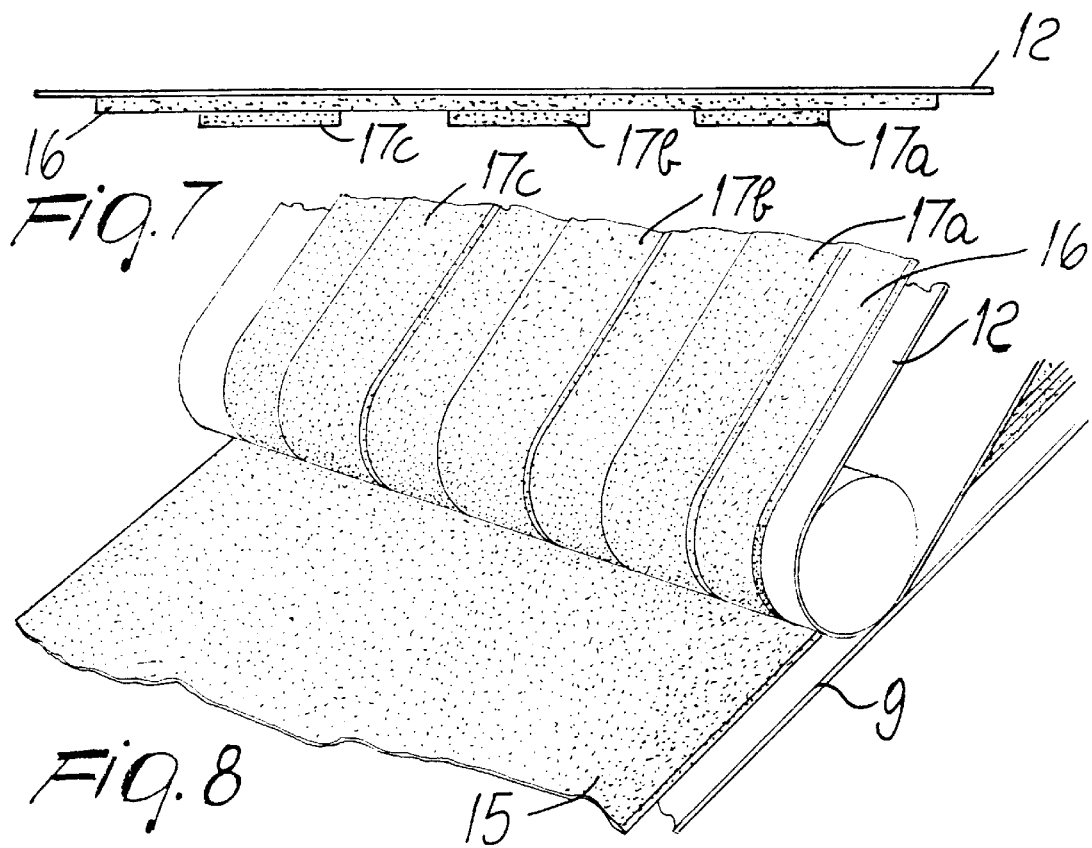
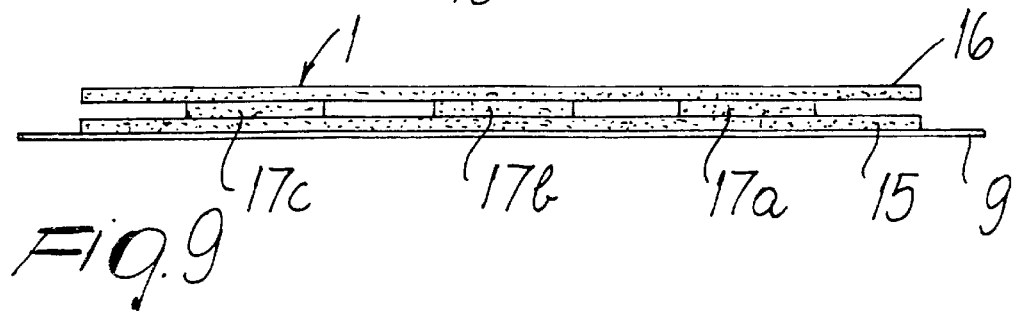

APPARATUS FOR MANUFACTURING A FILTERING MEDIUM IN SHEET FORM

BACKGROUND OF THE INVENTION

The present invention relates to an apparatus for manufacturing a filtering medium in sheet form.

Filters for fluids which comprise a structure for supporting and containing a filtering mass, through which the fluid to be filtered is passed so as to flow from a region connected to an inlet connector to a region connected to an outlet connector, are conventionally widely used in various fields of technology.

The filtering medium used most frequently is constituted by a sheet of paper, which is inserted in the filter after being folded and rolled up according to various methods; a filtering medium in sheet form has been recently proposed which comprises regions having a differentiated filtration degree and offers numerous advantages.

In one embodiment of the filtering medium, for example, the medium comprises longitudinal bands which alternately have a different filtration degree.

It is also known that paper-making technology entails the presence of at least two kinds of continuous machine.

A first kind of machine, known as flat-screen machine, comprises a head box which conveys natural or synthetic fibers in an aqueous suspension over a conveyor constituted by a supporting screen, which moves above suction boxes suitable to collect the water that passes through the screen, so as to form on the screen a fiber mat, known as web, which is then gradually dried until it assumes the conventionally sheet-like configuration.

A second type of machine, known as cylinder machine, comprises a container which contains a fibrous suspension in water and a hollow cylinder which is partially immersed in the suspension and covered with a wire mesh or equivalent material and rotates about a horizontal axis.

During rotation, the fibers cling to the surface of the wire mesh and are picked up by a conveyor constituted by a supporting felt, which is arranged tangent to the cylinder and is pushed against it by a presser roller.

There are machines which have a cylinder with a uniformly transparent wire mesh and machines in which the cylinder has a wire mesh with closed regions where no fibers deposit on the supporting felt.

SUMMARY OF THE INVENTION

The aim of the present invention is to provide an innovative apparatus which is capable of forming the filtering medium and has regions having a differentiated filtration degree.

This aim is achieved by an apparatus for manufacturing a filtering medium in sheet form according to the invention, characterized in that it comprises at least one first continuous machine, adapted for manufacturing paper and the like and suitable to form at least one first filter web on a first conveyor, and at least one second continuous machine also adapted for paper-making and the like and suitable to form at least one second filter web on at least one second conveyor, said at least one second conveyor being arranged so as to make said at least one second filter web rest by gravity on said at least one first filter web, at least one of said first and second continuous machines being suitable to form a filter web which is not uniformly distributed.

BRIEF DESCRIPTION OF THE DRAWINGS

Further characteristics and advantages of the present invention will become apparent from the following detailed description of a preferred but not exclusive embodiment of the invention, illustrated only by way of non-limitative example in the accompanying drawings, wherein:

FIG. 1 is a perspective view of a portion of a sheet of filtering medium to be produced with the apparatus according to the invention;

FIGS. 3 and 4 are views of the cylinders of the two cylinder machines included in the apparatus according to the invention;

FIGS. 5, 6 and 7 are schematic sectional views taken along the planes V—V, VI—VI, VII—VII of FIG. 2, respectively;

FIG. 8 is a perspective view of a detail of the apparatus according to the invention;

FIG. 9 is a sectional view, taken along the plane IX—IX of FIG. 2.

DESCRIPTION OF THE PREFERRED EMBODIMENTS

Figure 2:
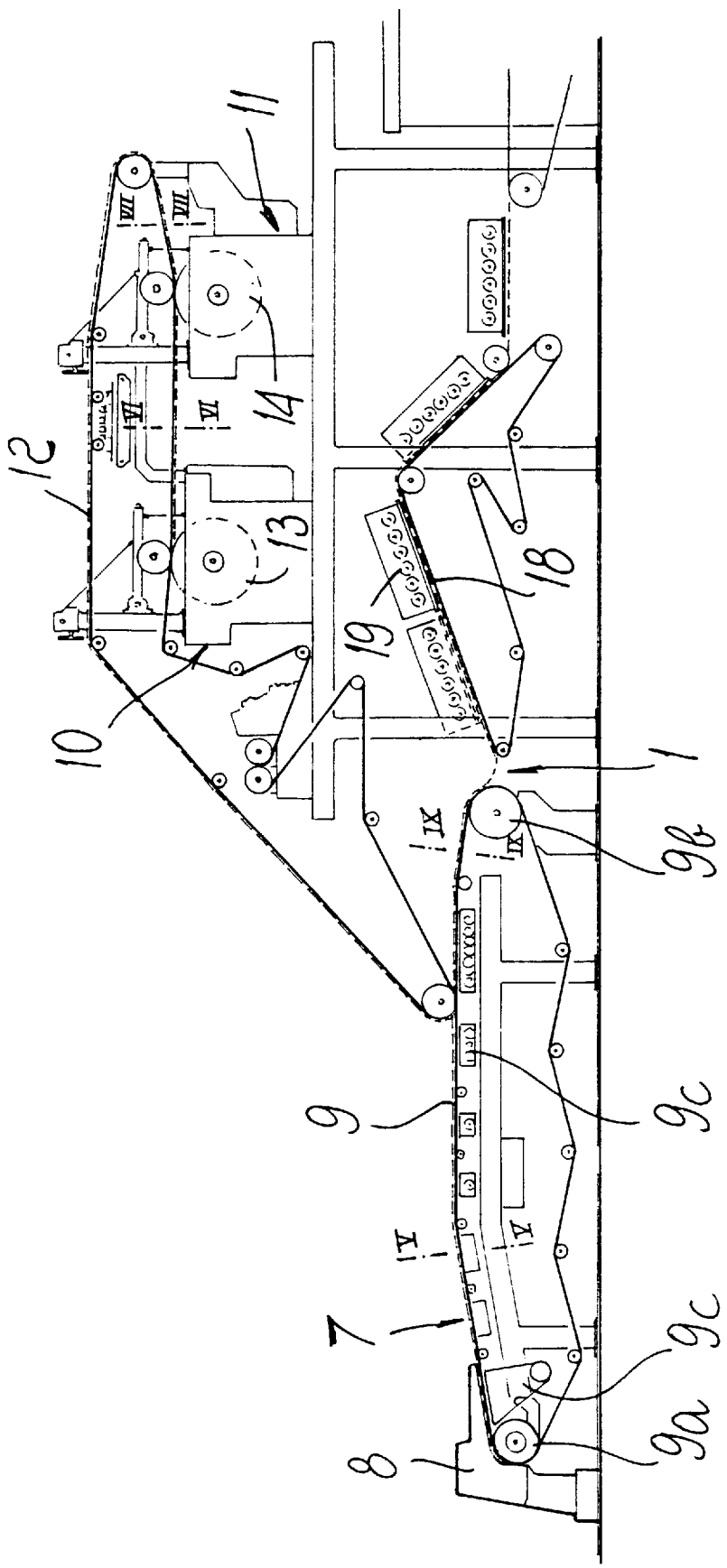
FIG. 2 is an elevation view of the portion of interest of the apparatus according to the invention.

With reference to the above FIG. 1, the reference numeral 1 generally designates a portion of a sheet which forms a filtering medium, which comprises regions in the form of longitudinal bands having a different filtration degree; the regions 2, 3, and 4 in fact provide for a fine filtration degree, whilst the regions 5 and 6 provide for a coarse filtration degree; the lateral bands are not considered because they are meant to be inserted in the structure of a filter.

An apparatus for producing the sheet of FIG. 1 comprises, as seen in FIG. 2, at least a first continuous machine of a kind suitable for manufacturing paper, more specifically of the flat-screen type, generally designated by the reference numeral 7, which comprises in a known manner a head box 8, which carries a fibrous suspension in water onto the conveyor constituted by the supporting screen 9 which acts between the cylinders 9a and 9b with underlying suction boxes such as 9c.

A first filter web or mat of fibers is thus formed on the supporting screen 9 and is obtained by removing the water that contained the fibers in suspension, the entire system being uniformly distributed, as explained in greater detail when describing the operation of the invention.

The reference numerals 10 and 11 of FIG. 2 respectively designate a second machine and a third machine of a kind suitable for manufacturing paper and more specifically of the cylinder type, which operate in combination with the conveyor constituted by the supporting felt 12 by depositing thereon two superimposed web plies.

The cylinder 13 provided in the machine 10 has a continuous wire mesh 13a as seen in FIG. 3 and therefore the web ply formed by it on the supporting felt 12 is uniformly distributed, whilst the cylinder 14 provided in the machine 11 is provided with a wire mesh which is transparent only at the bands 14a, 14b and 14c, whilst the bands 14d, 14e are closed as seen in FIG. 4; accordingly, a web ply with longitudinal bands is obtained from said cylinder, as explained in greater detail when describing the operation.

An important characteristic of the invention is constituted by the fact that the supporting felt 12 is arranged so as to make the superimposed web plies formed thereon rest by gravity on the web formed on the supporting screen 9, as shown in the detail of FIG. 8.

Operation of the invention is as follows.

Whilst the uniformly distributed web, designated by the reference numeral 15 in FIG. 5, is formed on the supporting screen 9, the machine 10 forms on the supporting felt 12 the uniformly distributed web ply 16 as seen in FIG. 6, on which the web ply formed by the machine 11 and constituted by the bands 17a, 17b and 17c is superimposed as seen in FIG. 7.

When the supporting felt 12 deposits, as shown in FIG. 8, the webs formed thereon onto the web 15, resting them by gravity with a very gentle action, the layer 15 maintains its softness, thus forming a sheet 1, as shown schematically in the sectional view of FIG. 9, which has regions with a differentiated filtration degree determined by the different amount of fibers in the different regions of its thickness and has optimum characteristics as regards the filtration function.

When it leaves the supporting mesh 9 of the flat-screen machine 7, the sheet 1 moves onto the wire mesh 18 and undergoes the action of devices such as 19, which emit infrared rays, and then moves on for the subsequent steps for drying and collection according to the prior art.

The invention is susceptible of numerous modifications and variations, all of which are within the scope of the inventive concept: thus, for example, there may be two or more conveyors suitable to rest by gravity respective webs formed thereon in an intermediate position of a first conveyor on which at least one web has been formed: the number and type of the machines that operate in combination with the various conveyors may also be different from the one described.

In the practical embodiment of the invention, all the details may furthermore be replaced with other technically equivalent elements; the materials employed, the shapes and the dimensions may also be any.

What is claimed is:

1. An apparatus for manufacturing a paper filtering medium in sheet form, comprising;

at least one first continuous paper manufacturing machine for manufacturing at least one first web of filter paper on a first conveyor of said first machine; and at least one second continuous paper manufacturing machine for manufacturing at least one second web of filter paper on at least one second conveyor of said second machine, said first conveyor of said first machine being arranged such that said first web of filter paper is arranged on top of and above said first conveyor with respect to the ground, and said second conveyor of said second machine being arranged with respect to said first conveyor of said first machine such that said second web of filter paper is deposited on top of said first web of filter paper to form the paper filter medium in sheet form with said first conveyor being arranged below said first web of filter paper and said second web of filter paper arranged on top of said first web of filter paper, and such that said second conveyor of said second machine is arranged above said second web of filter paper which together with said first web of filter paper is sandwiched between said second conveyor and said first conveyor;

said second continuous machine having a first portion for manufacturing a uniformly distributed first web portion with uniform filtering characteristics of said second web of filter paper, and said second machine having a second portion for manufacturing a non-uniformly distributed second web portion with non-uniform filtering characteristics by manufacturing web bands which are mutually spaced by gaps, and said first and second portions of said second machine being arranged for attaching said non-uniformly distributed second web portion to said uniformly distributed first web portion to form said second web of filter paper such that said uniformly distributed first web portion is supported by said second conveyor of said second machine while said non-uniformly distributed second web portion is supported on said uniformly distributed first web portion at a side of said uniformly distributed first web portion opposite to said second conveyor of said second machine; and said second conveyor of said second machine being arranged with respect to said first conveyor of said first machine such that said second web of filter paper comprising the mutually attached uniformly distributed first web portion and non-uniformly distributed second web portion is separately formed with respect to said first web of filter paper, and further such that said separately formed second web of filter paper is deposited on top of said separately formed first web of filter paper with said non-uniformly distributed second web portion of said second web of filter paper making direct contact with said first web of filter paper and being sandwiched between said first web of filter paper and said uniformly distributed first web portion of said second web of filter paper to form the paper filter medium in sheet form.

2. An apparatus according to claim 1, wherein said first continuous machine is of the flat-screen type, which comprises a head box and a substantially flat supporting screen, said second conveyor of said second machine being arranged so as to deposit said second web of filter paper on the first web of filter paper formed by said first machine in an intermediate position of the corresponding supporting screen.

3. An apparatus according to claim 1, wherein said first and second portions of the second machine are each paper manufacturing machines of the cylinder type arranged to form the superimposed first and second web portions of said second web of filter paper on said second conveyor of said second machine.

* * * * *